No. 675,428. Patented June 4, 1901.
E. E. VOORHEES.
HARROW ATTACHMENT.
(Application filed Nov. 28, 1899.)
(No Model.) 3 Sheets—Sheet 1.
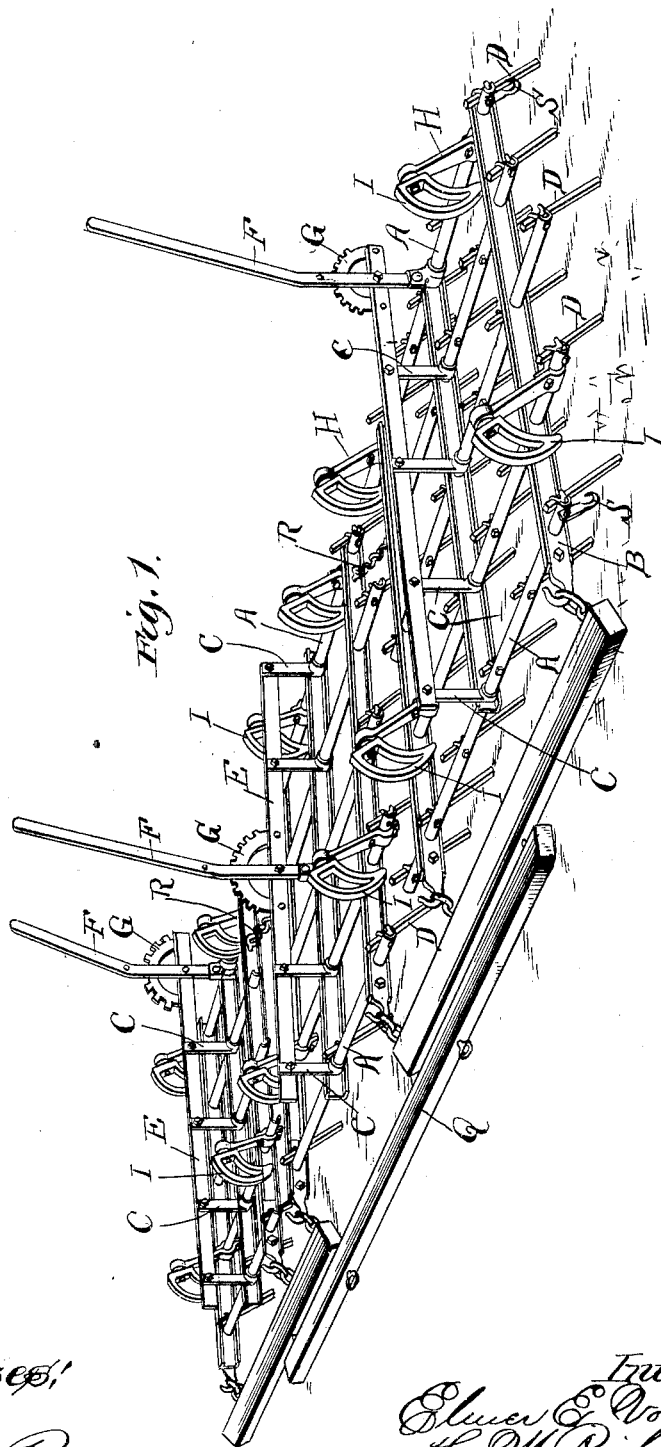

No. 675,428. Patented June 4, 1901.
E. E. VOORHEES.
HARROW ATTACHMENT.
(Application filed Nov. 28, 1899.)
(No Model.) 3 Sheets—Sheet 2.
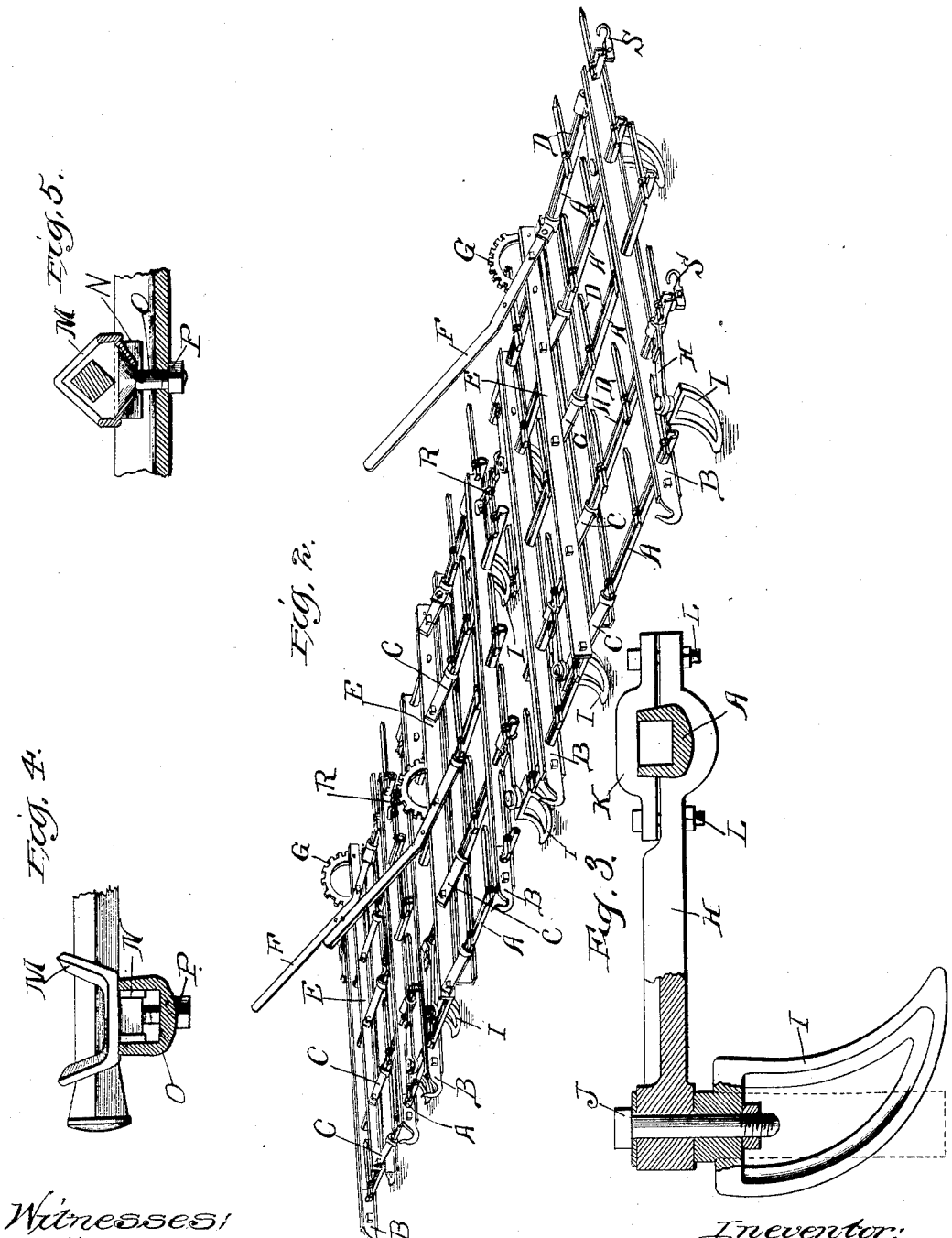

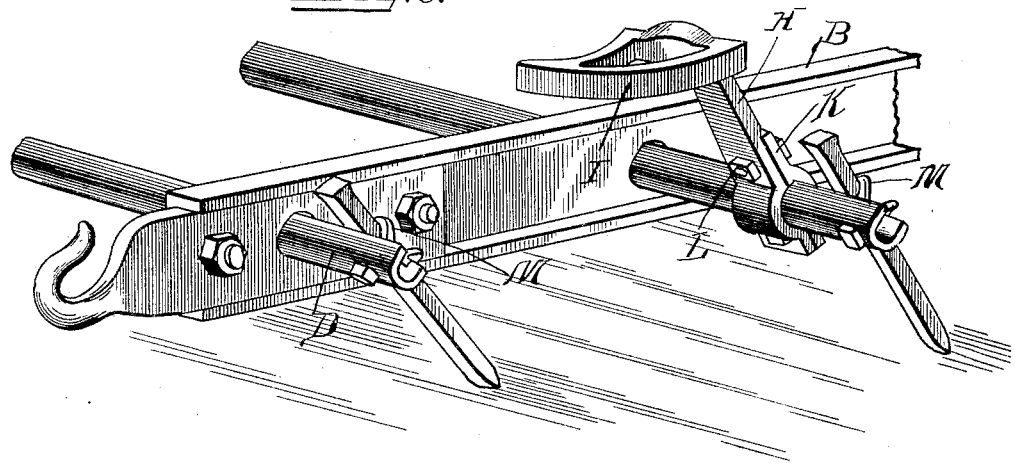
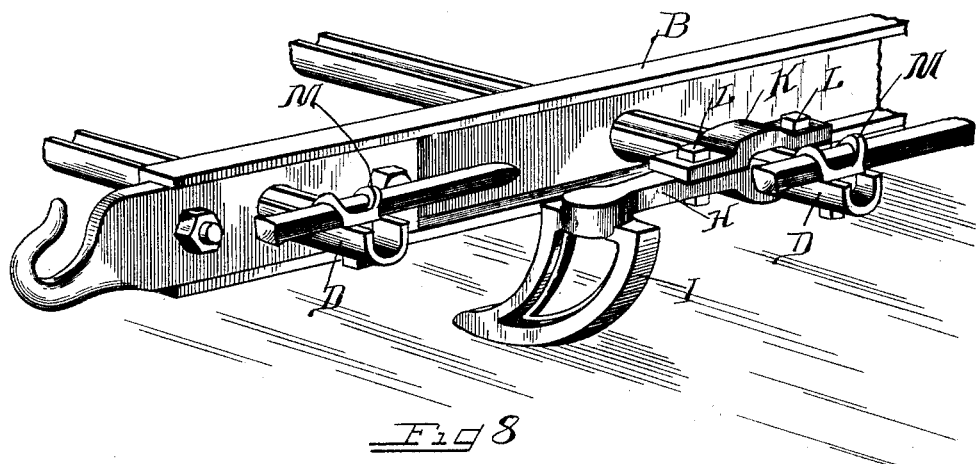
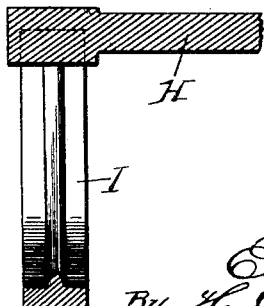

UNITED STATES PATENT OFFICE.

ELMER E. VOORHEES, OF BLANDINSVILLE, ILLINOIS.

HARROW ATTACHMENT.

SPECIFICATION forming part of Letters Patent No. 675,428, dated June 4, 1901.

Application filed November 28, 1899. Serial No. 738,602. (No model.)

*To all whom it may concern:*

Be it known that I, ELMER E. VOORHEES, a citizen of the United States, residing at Blandinsville, in the county of McDonough and State of Illinois, have invented certain new and useful Improvements in Harrow-Attachments, of which the following is a specification.

This invention relates to improvements in attachments for harrows, and more particularly to that class of such devices designed to afford temporary runners or carriers for the harrow-sections when the harrow-teeth are raised from the ground and to support the harrow while being drawn from place to place in a field or from field to field. I am aware that there have been numerous inventions proposed in this general class of attachments; but so far as I know none such are designed or adapted for use upon lever-harrows to permit the dragging of the harrow in any direction but that in which it is drawn in doing its regular work, and especially is this true in the case of harrows made up in sections, for such harrows cannot now be dragged through gateways of less width than the combined width of the harrow-sections unless the sections are folded over upon one another.

The primary object of my invention is to provide lever-harrows with runners or carriers adapted to be operated simultaneously with the harrow-teeth, but so as to be brought in contact with or cleared from the ground alternately with the harrow-teeth and which enable the harrow to be drawn endwise when supported thereon—that is, at right angles to the direction in which the harrow is drawn when supported upon its pivot in operation.

Another object is to have a sectional harrow equipped with runners or carriers of such character that the harrow may be drawn either endwise or sidewise or in any other direction while supported upon the runners or carriers, whereby a very wide harrow that when drawn sidewise, as in operation, would require a sixteen or twenty foot gate may be drawn endwise through a comparatively narrow six or eight foot gate without disconnecting the sections or folding them upon one another, which would not be practical with either an ordinary lever or a riding harrow.

A further object is to have the runners or carriers practically connected with the harrow-sections after the manner of a caster-wheel, so that the harrow-section may be dragged in any direction when supported upon said runners, whereby a harrow made up of a number of sections may be drawn through an opening that would ordinarily accommodate but one section and without the necessity for disconnecting the sections or folding them upon one another.

These and such other objects as may hereinafter appear are attained by the devices illustrated in the accompanying drawings, in which—

Figure 1 is a perspective view of a harrow embodying my invention, showing the teeth and runners in the position they occupy while being used as a harrow. Fig. 2 is a similar view, but showing the teeth of the harrow and the runners in the position they occupy in being drawn from field to field, the runners being turned to the position they would occupy in being drawn endwise. Fig. 3 is an enlarged detail sectional elevation through one of the harrow tooth-bars and the runners. Figs. 4 and 5 are detail views showing the manner of fastening the harrow-teeth to the bars; Figs. 6 and 7, enlarged detail perspective views showing a modification of my invention, and Fig. 8 a detail sectional view of the runner.

Similar letters of reference indicate the same parts in the several figures of the drawings.

My invention is especially applicable to lever-harrows and may be applied to harrows of any usual or desired construction, it being immaterial how many harrow-sections are used, how the harrow-teeth are fastened to the bars, or how the bars are operated by the levers to throw the teeth into and out of operation and whether the harrow be a riding or a walking harrow.

The type of harrow shown in the drawings illustrates a form now very generally found upon the market and is selected simply because it affords a perfect means of illustrating the application of my invention. This harrow is shown as composed of three sections, and each section comprises the tooth-bars A, journaled suitably in the end draft-bars B, each tooth-bar being provided near its center of length with a crank-arm C, projecting therefrom in a radial line nearly opposite that of the harrow-teeth D, which are suitably secured to the tooth-bars at regular intervals. The ends of the crank-arm C are connected by a single bar E, the crank-arm at the rear side of the section being prolonged to form a hand-lever F, provided with a suitable latch to engage a segment G, secured to the bar E, such features being so common as to not require illustration in detail. Thus it will be seen that whenever the lever F is vibrated it will cause a corresponding rocking of the tooth-bars in their journal-bearings, and as the harrow-teeth extend rigidly from the tooth-bars said teeth may be either projected downwardly toward the ground at an angle of about forty-five degrees, more or less, as illustrated in Fig. 1, or they may be turned up so as to lie in substantially a horizontal plane parallel with the end draft-bars B, as illustrated in Fig. 2.

As shown in Figs. 1, 2, and 3, from two or more tooth-bars proceed arms H, extending radially in the opposite direction from the teeth on said bar, which arms have pivotally secured at their free ends and extending at right angles thereto the runners I, which may be in the form shown in the drawings and particularly in Fig. 3, as curved away to one side of their pivots J, or they may be carriers in the shape of ordinary caster-wheels, which may be substituted for the runners in a manner too obvious to require illustration. It will thus be seen that when the harrow-teeth are down upon the ground in position for work the runners or carriers will be suspended clear of the ground above the sections, as illustrated in Fig. 1; but when the harrow-teeth are thrown to the position shown in Fig. 2, then the runners or carriers will be down upon the ground and form the support for the harrow-section, the teeth at this time being clear of the ground.

As above set forth, the runners I are mounted at the free ends of the arms H, the latter extending radially from the tooth-bars. By this construction it will be seen that the contact of the runner with the ground is out of vertical alinement with the tooth-bar, and yet having the axis of the pivotal connection between the runner and arm extending vertically to insure a proper pivotal movement of the runner. Therefore there is a slightly yielding or cushioning connection between the runner and the tooth-bar, due to the natural resiliency of the metal of the arm H, so that any tendency to distort the shape of the tooth-bars when passing over uneven ground, such as is present, for instance, where the runner or caster wheel is connected directly and rigidly to the tooth-bar, is prevented.

In practice there are many forms of harrow tooth-bars to be found in harrows of this class, some being square wooden or metallic bars, some being round, and others of the U-shaped type illustrated in the drawings. Of course the clip for attaching the arms H to the tooth-bars should be especially constructed and adapted for use upon the harrow tooth-bars for which they are designed, though the form of clip shown more particularly in Fig. 3 will take almost any shape of bar. This clip consists simply of forming a half-socket in the end of the arm and another half-socket in a cap K, which is secured to the arm at each side of the socket by the bolts L, which serve to tightly clamp the arm to the tooth-bars. The manner of fastening the harrow-teeth to the tooth-bars is also immaterial, that shown in Figs. 4 and 5 being the common form and found in the harrow to which my invention is shown as applied. It consists of the yoke M, perforated to receive the harrow-tooth and having a filling-block N integral therewith which fits between the sides of the U-shaped bar and is centrally perforated to receive the head of a screw-bolt O, which passes through the central part of the bar and has a nut P applied to the end thereof at the back of the bar.

It is obvious that when the runners or carriers are thrown down upon the ground, as illustrated in Fig. 2, the harrow may be drawn along the ground in any direction resting upon these runners. Ordinarily in the operation of the harrow the team would be attached to the doubletree Q or some equivalent draft device hitched to the ends of the draft-bars B at the forward side of each harrow-section, as illustrated in Fig. 1, the ends of said bars terminating in hooks for this purpose. At the rear sides the adjacent ends of the sections may be connected by short slack chains which permit of the independent rising and falling of the sections in the work of the harrow, as shown at R, although of course these chains may, if desired, be disconnected from one of the sections during the work of the harrow. The only useful part these chains play in conjunction with my invention is when it is desired to move the harrow from field to field. When this is done, the doubletrees are thrown over upon the harrow-sections and may serve as a connection between them at the forward side of the harrow-sections, (although of course the chains R may be duplicated at this side,) while the chains R serve to connect the harrow-sections at their rear sides. The team is now hitched to the hooks S at the end of the end section of the harrows or to any other desired part at the said end, and the harrow may now be drawn along endwise instead of sidewise, and will thus be able to pass through a comparatively narrow gate of ordinary dimensions—say five to eight feet, according to the width of the harrow-sections—while if the harrow were drawn along sidewise, as in Fig. 1, it would not pass through a gate of less than fifteen to twenty feet in width, and it must be borne in mind that with either a lever-harrow or a riding-harrow it would not be practical to either separate the sections from one another nor fold them over upon one another, so that with such kind of harrows particularly my invention is of the utmost importance in the practical and daily use thereof.

In Figs. 1, 2, and 3 I have shown the preferred embodiment of my invention in the shape of caster-runners, because they permit the drawing of the harrow in any direction when supported thereon; but so far as relates to the broad idea of my invention the runners need not be pivoted or caster runners, for the principal aim of my invention is to enable the harrow, and especially when composed of a number of sections, as shown in Figs. 1 and 2, to be drawn endwise through a narrow gate without uncoupling or piling the sections upon one another. Hence, as shown in Figs. 6, 7, and 8, which is the simplest embodiment of my invention, the runners may be fixed or permanent runners at right angles to the ordinary line of draft of the harrow, the pivot connection between the runners I and the arms H (shown in the preferred form) being here dispensed with. When a harrow is thus equipped, it can only be drawn in one direction upon the runners—that is, endwise or at right angles to the usual line of draft; but such runners being secured to the tooth-bars, as in the preferred construction, are brought into contact with the ground alternately with the teeth and operate in the same manner as the runner of the preferred construction so far as enabling the drawing of the harrow at right angles to its usual line of draft in moving from field to field.

Obviously the form of the parts, as well as the disposition thereof and the particular manner of attaching the runners to the harrow, is immaterial and may be varied without departing from the spirit of my invention so long as the objects thereof are attained.

Having thus fully described my invention, what I claim, and desire to secure by Letters Patent, is—

1. The combination with a lever-harrow composed of sections connected at their side edges, of a runner secured to the tooth-bars of said harrow and adapted to be brought into contact with the ground alternately with the harrow-teeth, and out of vertical alinement with the tooth-bars, said runner being disposed at right angles to the harrow-teeth whereby the harrow may be drawn endwise thereon as contradistinguished from the normal sidewise draft employed in harrowing, substantially as described.

2. The combination with a lever-harrow composed of sections connected at their side edges, of a pivoted runner secured to the tooth-bars of the said harrow, and adapted to be brought in contact with the ground alternately with the harrow-teeth, and out of vertical alinement with the tooth-bars, substantially as described.

3. The combination with a lever-harrow composed of a plurality of sections and means for connecting the opposing ends of said sections, of pivoted runners secured to the tooth-bars of said sections and adapted to be brought in contact with the ground alternately with the harrow-teeth, and out of vertical alinement with the tooth-bars, substantially as described.

4. The combination with a lever-harrow and the rocking tooth-bars thereof, of arms extending radially from a plurality of said bars in a direction opposite to the harrow-teeth and a runner secured to each of said arms and disposed at right angles to the harrow-teeth and out of vertical alinement with the tooth-bars, substantially as described.

5. The combination with a lever-harrow composed of sections connected at their side edges and the rocking tooth-bars thereof, of arms extending radially from a plurality of said bars in a direction opposite to the harrow-teeth, and a runner pivotally secured to each of said arms out of vertical alinement with the tooth-bars, substantially as described.

ELMER E. VOORHEES.

Witnesses:
J. O. OAKMAN,
C. K. PRATHER.